United States Patent
Morris et al.

(10) Patent No.: US 8,262,342 B2
(45) Date of Patent: *Sep. 11, 2012

(54) GAS TURBINE ENGINE ASSEMBLIES WITH RECIRCULATED HOT GAS INGESTION

(75) Inventors: Mark C. Morris, Phoenix, AZ (US);
 Jeff Howe, Chandler, AZ (US); Greg Heitland, Mesa, AZ (US); Jason Smoke, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1095 days.

This patent is subject to a terminal disclaimer.

(21) Appl. No.: 12/171,000

(22) Filed: Jul. 10, 2008

(65) Prior Publication Data

US 2010/0008760 A1 Jan. 14, 2010

(51) Int. Cl.
 *F01D 5/14* (2006.01)
(52) U.S. Cl. .......................... 415/115; 415/191
(58) Field of Classification Search .................. 415/115, 415/191
See application file for complete search history.

(56) References Cited

U.S. PATENT DOCUMENTS

| | | | |
|---|---|---|---|
| 5,545,004 | A | 8/1996 | Ho et al. |
| 6,481,959 | B1 | 11/2002 | Morris et al. |
| 6,942,445 | B2 | 9/2005 | Morris et al. |
| 7,334,985 | B2 | 2/2008 | Lutjen et al. |
| 2006/0120855 | A1 | 6/2006 | Djeridane et al. |
| 2009/0317244 | A1* | 12/2009 | Howe et al. ................. 415/177 |

* cited by examiner

*Primary Examiner* — Jarrett Stark
*Assistant Examiner* — Nicholas Tobergte
(74) *Attorney, Agent, or Firm* — Ingrassia Fisher & Lorenz, P.C.

(57) ABSTRACT

A gas turbine engine assembly includes a housing including an annular duct wall that at least partially defines a mainstream hot gas flow path configured to receive mainstream hot gas flow. The assembly further includes a stator assembly including a stator vane that extends into the mainstream hot gas flow path and a turbine rotor assembly downstream of the stator assembly that includes a turbine disk and a turbine blade extending from the turbine disk into the mainstream hot gas flow path. The stator assembly and turbine assembly define a turbine disk cavity, and the turbine disk cavity includes a recirculation cavity configured to recirculate gas ingested from the mainstream hot gas flow path back into the mainstream hot gas flow path.

20 Claims, 3 Drawing Sheets

GAS TURBINE ENGINE ASSEMBLIES WITH RECIRCULATED HOT GAS INGESTION

TECHNICAL FIELD

The present invention generally relates to gas turbine engine assemblies, and more particularly relates to gas turbine engine assemblies with improved thermal isolation of engine components from ingested, high temperature mainstream combustor gases.

BACKGROUND

Gas turbine engines are generally known in the art and used in a wide range of applications, such as aircraft engines and auxiliary power units for aircraft. In a typical configuration, the turbine of such engines includes rows of stator vanes and rotor blades disposed in an alternating sequence along the axial length of a generally annular hot gas flow path. The rotor blades are mounted at the periphery of one or more rotor disks that are coupled in turn to a main engine shaft. Hot combustion gases are delivered from an engine combustor to the annular hot gas flow path, thus resulting in rotary driving of the rotor disks to provide an engine output.

In most gas turbine engine applications, it is desirable to regulate the operating temperature of certain engine components in order to prevent overheating and potential mechanical failures attributable thereto. That is, while the engine stator vanes and rotor blades are specially designed to function in the high temperature environment of the mainstream hot gas flow path, other engine components may not be designed to withstand the high temperatures of the mainstream hot gas flow. Accordingly, in many gas turbine engines, the volumetric space disposed radially inwardly or internally from the hot gas flow path includes an internal engine cavity through which a cooling air flow is provided. The cooling air flow is normally obtained as a bleed flow from a compressor or compressor stage forming a portion of the gas turbine engine. The cooling of the internal engine cavity attempts to maintain the temperatures of the rotor disks and other internal engine components that are suitable for their material and stress level.

In many conventional engines, relatively high cooling air flows have been used to obtain satisfactory temperature control of engine components within the cooled internal engine cavity. In addition, the demand for cooling flow has been impacted by an irregular and unpredictable ingestion of mainstream hot gases from the hot gas flow path into the internal engine cavity. Various attempts to prevent flow between adjacent stator vanes and rotor blades have primarily involved the use of overlapping lip-type structures in close running clearance, often referred to as flow discouragers, but these structures have not been as effective as desired in preventing hot gas ingestion.

A variety of baffle-type structures and techniques have also been proposed, in addition to the traditional flow discouragers, in effort to minimize hot gas ingestion into the internally cooled cavity of gas turbine engines. Such approaches have included pockets with complex shape, some of which receive separate flows of cooling gas, to prevent hot gas ingestion. In the past, these techniques may have been less effective than desired, and/or may have used structures of complex shape and/or mounting arrangements at the time of initial engine production.

Accordingly, it is desirable to provide an improved gas turbine engine assembly that reduces or eliminates the effects of hot gas ingestion. In addition, it is desirable to provide a recirculation cavity that captures and recirculates ingested hot gas with high efficiency. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a gas turbine engine assembly includes a housing including an annular duct wall that at least partially defines a mainstream hot gas flow path configured to receive mainstream hot gas flow. The assembly further includes a stator assembly including a stator vane that extends into the mainstream hot gas flow path and a turbine rotor assembly downstream of the stator assembly that includes a turbine disk and a turbine blade extending from the turbine disk into the mainstream hot gas flow path. The stator assembly and turbine assembly define a turbine disk cavity, and the turbine disk cavity includes a recirculation cavity configured to recirculate gas ingested from the mainstream hot gas flow path back into the mainstream hot gas flow path.

In accordance with another exemplary embodiment, an assembly is provided for recirculating gas ingested from a mainstream hot gas flow into a turbine disk cavity between a stator assembly and a turbine assembly in a gas turbine engine. The assembly includes a stationary discourager configured to be positioned on a downstream side of the stator assembly and a turbine rotor discourager configured to be positioned on an upstream side of the turbine assembly. The stationary and turbine rotor discouragers define a recirculation cavity for recirculating the ingested gas back into the mainstream hot gas flow.

In accordance with yet another exemplary embodiment, a gas turbine engine assembly includes a housing including an annular duct wall that at least partially defines a mainstream hot gas flow path configured to receive mainstream hot gas flow. A stator assembly includes a stator vane that extends into the mainstream hot gas flow path. The stator assembly further includes a stationary discourager extending in a downstream direction. A turbine rotor assembly is downstream of the stator assembly and includes a turbine disk and a turbine blade extending from the turbine disk into the mainstream hot gas flow path. The turbine rotor assembly further includes a turbine discourager that extends in an upstream direction and is overlapped by the stationary discourager. The stator assembly and turbine assembly define a turbine disk cavity with a gap adjacent the mainstream hot gas flow between the turbine discourager and the stationary discourager. The turbine disk cavity includes a recirculation cavity configured to recirculate gas ingested from the mainstream hot gas flow path back into the mainstream hot gas flow path. The recirculation cavity includes a first recirculation section adjacent the gap and configured to recirculate a first portion of the ingested gas in a first direction, and the first recirculation section is at least partially formed by a first deflector extending from the turbine discourager. A second recirculation section is adjacent the first recirculation section and configured to recirculate a second portion of the ingested gas in a second direction, and the second recirculation section is at least partially formed by the first deflector extending from the turbine discourager and a second deflector extending from the stationary discourager. A third recirculation section is configured to recirculate a third portion of the ingested gas in the first direction, and the third section is at least partially defined by the second deflector extending from the stationary discourager and a third deflector extending from the stationary discourager.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engine assemblies that reduce or eliminate of the effects of hot gas ingestion. More particularly, exemplary gas turbine engine assemblies include recirculation cavities for recirculating ingested gas back into the mainstream hot gas flow path. Additionally, some exemplary embodiments include deflectors to manipulate the ingested gas and to create one or more recirculation sections in each recirculation cavity. The gas turbine engine assemblies produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

Figure 1:
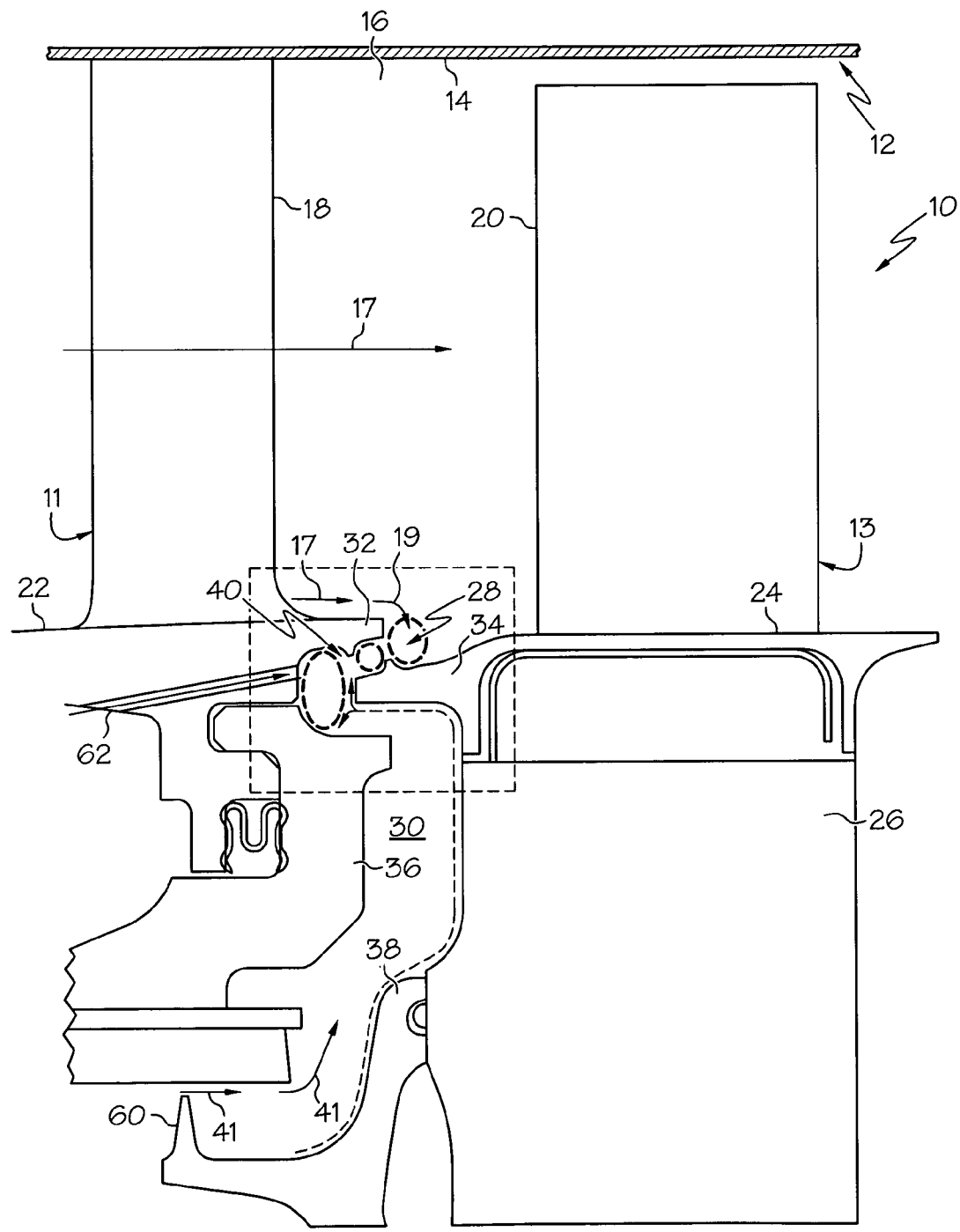
FIG. 1 is a partial cross section of a gas turbine engine assembly with a recirculation cavity in accordance with an exemplary embodiment.

FIG. 1 is a fragmented vertical sectional view illustrating a portion of a gas turbine engine assembly 10 in accordance with an exemplary embodiment. The gas turbine engine assembly 10 has an overall construction and operation that is generally known to and understood by persons skilled in the art. In general terms, the gas turbine engine assembly 10 has a housing 12 with an annular duct wall 14 that defines a mainstream hot gas flow path 16 for receiving mainstream hot gas flow 17 from an engine combustor (not shown). The housing 12 additionally houses at least one stator assembly 11 with stator vanes 18 and at least one turbine rotor assembly 13 with turbine rotor blades 20. The mainstream hot gas flow 17 flows past axially spaced circumferential rows of stator vanes 18 and turbine rotor blades 20, which are appropriately formed from suitable material capable of withstanding the high temperature environment.

The stator vanes 18 of the stator assembly 11 project radially outwardly from an inner circumferential wall 22 to the annular duct wall 14. The inner circumferential wall 22 can be directly mounted to the combustor (not shown), or coupled to the combustor through intervening components, to form a portion of the mainstream hot gas flow path 16 with the annular duct wall 14. The turbine rotor blades 20 of the turbine rotor assembly 13 project radially outward from a turbine rotor platform 24 that is coupled to a turbine disk 26, which in turn circumscribes a shaft (not shown). The mainstream hot gas flow 17 drives the turbine rotor blades 20 and the associated turbine rotor assembly 13 for power extraction.

A gap 28 exists between the stator assembly 11 and the turbine assembly 13, and transitions into a turbine disk cavity 30 that is formed upstream of the turbine disk 26. As discussed in further detail below, a portion of the mainstream hot gas flow 17 may attempt to flow through the gap 28 as ingested gas 19. The elevated temperatures of the mainstream hot gas flow 17 may adversely affect certain components in the disk cavity 30. During operation, pressure gradients may occur along the mainstream hot gas flow path 16 and contribute to the somewhat unpredictable nature of the ingested gas 19.

In the depicted exemplary embodiment, the gap 28 is defined by a stationary discourager 32 extending downstream from the inner circumferential wall 22 and a turbine discourager 34 extending upstream from the turbine disk 26. Generally, the stationary discourager 32 and the turbine discourager 34 overlap one another. The turbine disk cavity 30 is generally formed by one or more portions of a seal support 36 coupled to the inner circumferential wall 22, a forward seal rotor 38 coupled to the turbine disk 26, the inner circumferential wall 22, the stationary discourager 32, the turbine discourager 34, and the turbine disk 26. A labyrinth seal 60 is mounted between the seal support 36 and the forward seal rotor 38.

Various systems and methods are provided for maintaining an appropriate temperature in the turbine disk cavity 30 and thermally accommodating for the ingested gas 19. The cooling systems and methods include at least one of a recirculation cavity 40, cavity purge air 41, and ingestion inhibiting dynamic jets 62, which are introduced here and discussed in further detail below. The cavity purge air 41 is obtained as bleed flow from a compressor or compressor stage and is routed to the turbine disk cavity 30 to purge and to assist in maintaining a normal steady state temperature of the components surrounding the turbine disk cavity 30. One or more ingestion inhibiting dynamic jets 62 may be formed in the inner circumferential wall 22 under the stationary discourager 32 for delivering additional cooling air flow. In an alternate embodiment, the ingestion inhibiting dynamic jets 62 are omitted.

Figure 2:
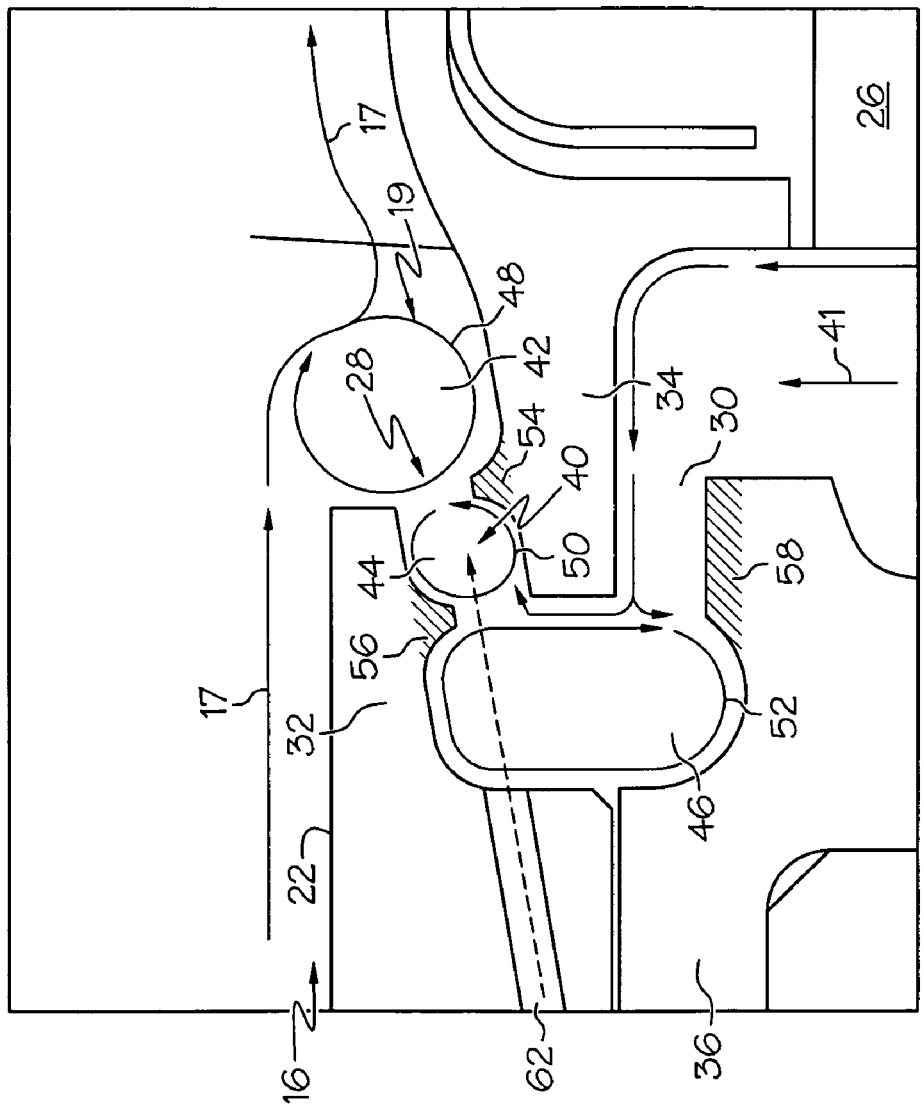
FIG. 2 is an enlarged cross section of a portion of the gas turbine engine assembly of FIG. 1.

FIG. 2 is an enlarged cross section of the turbine disk cavity 30 and the immediately surrounding static and dynamic structural elements, including the seal support 36, the inner circumferential wall 22, the stationary discourager 32, the turbine discourager 34, and the turbine disk 26. As noted above, the ingested gas 19 from the mainstream hot gas flow 17 may attempt to flow through the gap 28 into the turbine disk cavity 30, which includes components that may not be able to withstand the elevated temperatures of the mainstream hot gas flow 17.

At least one recirculation cavity 40 is formed in the turbine disk cavity 30. The recirculation cavity 40 receives at least some of the ingested gas 19 and redirects it back into the mainstream hot gas flow 17 such that components within the turbine disk cavity 30 are not damaged by elevated temperatures. As discussed in further detail below, the recirculation cavity 40 is formed by the static structures just downstream of and associated with the stator vanes 18, and the rotating structures just upstream of and associated with the turbine disk 26 and turbine blade 20. The recirculation cavity 40 can include one or more sections 42, 44, 46 defined by deflectors 54, 56, 58 that serve to recirculate the ingested gas 19 back out into a preceding recirculation cavity section or the mainstream hot gas flow path 16 itself. The recirculation cavity 40 can be assisted in this function by cavity purge air 41, ingestion inhibiting dynamic jets 62, and a pumping action resulting from the rotation of the turbine disk 26.

The first section 42 of the recirculation cavity 40 is immediately adjacent the gap 28 and just radially inside of the mainstream hot gas flow path 16. The first section 42 is at least partially defined by the turbine discourager 34, particularly by the first deflector 54 extending from the turbine discourager 34. The mainstream hot gas flow 17, the relative positions of the stationary discourager 32 and turbine discourager 34, and especially the first deflector 54 result in a first portion 48 of the ingested gas 19 being received by the first section 42, recirculated in a clockwise direction (in the view of FIG. 2), and delivered back into the mainstream hot gas flow path 16. A second portion 50 of the ingested gas 19 may flow into the second section 44 of the recirculation cavity 40.

The second section 44 is immediately adjacent to, and just radially inside of, the first section 42. The second section 44 is formed between the turbine discourager 34 and the stationary discourager 32, and is particularly formed by the first deflector 54 extending from the turbine discourager 34 and the second deflector 56 extending from the stationary discourager 32. The second portion 50 of the ingested gas 19 is received by the second section 44 from the first section 42, recirculated in a counter-clockwise direction (in the view of FIG. 2), and delivered back into the first section 42 for subsequent recirculation back into the mainstream hot gas flow path 16. A third portion 52 of the ingested gas 19 may flow into the third section 46 of the recirculation cavity 40.

The third section 46 is immediately adjacent to, and just radially inside of, the second section 44. The third section 46 is formed between the turbine discourager 34, the stationary discourager 32, and the seal support 36, and is particularly formed by the second deflector 56 extending from the stationary discourager 32 and the third deflector 58 extending from the seal support 36. The third portion 52 of the ingested gas 19 is received by the third section 46 from the second section 44, recirculated in a clockwise direction (in the view of FIG. 2), and delivered back into the second section 44 for subsequent recirculation back into the mainstream hot gas flow path 16. Any remaining ingested gas 19 that flows from the third section 46 into the interior of the turbine disk cavity 30 can be cooled by the cavity purge air 41. However, the utilization of the recirculation cavity 40 may reduce the need for cavity purge air 41.

As suggested above, the deflectors 54, 56, 58 may include any feature that induces recirculation in the recirculation cavity 40. Computational fluid dynamics (CFD) analysis may be used to determine the orientation and location of useful deflectors 54, 56, 58. The dimensions of useful deflectors 54, 56, 58 may depend on factors including application and engine design. For example, the deflectors 54, 56, 58 may be fillets or chamfers having a radius between about 0.02 inches and about 0.5 inches.

The cavity purge air 41 that is pumped up the face of the turbine disk 26 entrains and mixes with the third portion 52 of ingested gas 19, the second portion 50 of ingested gas 19, and the first portion 48 of ingested gas 19 to dilute and reduce the temperatures in the recirculation sections 46, 44, and 42. The cavity purge air 41 that is pumped up the face of the turbine disk 26 may entrain into the third portion 52 of ingested gas 19 to aid in maintaining the recirculation zone in the third recirculation section 46. Similarly, the cavity purge air 41 may aid in maintaining recirculation zones in sections 44 and 42. CFD analyses may be used to define the shapes of the various flow discouragers 34 and 32 and the various deflectors 58, 56, and 54 to optimize the strength and structure of the recirculation zones to produce an optimal ingestion inhibiting configuration.

As also noted above, one or more ingestion inhibiting dynamic jets 62 can be arranged circumferentially around the inner circumferential wall 22. As shown, the ingestion inhibiting dynamic jet 62 is below the stationary discourager 32 and above the turbine discourager 34. The ingestion inhibiting dynamic jet 62 may provide additional cooling air and/or assist the recirculation cavity 40 in recirculating the ingestion gas 19 back into the mainstream hot gas flow path 16. The dynamic jets 62 may be oriented to be deflected by deflectors 56 or 54 to help induce recirculation in sections 46 or 44 as determined by CFD analysis.

The ingestion inhibiting dynamic jet 62 is aimed in the general direction of the ingested gas 19. Typically, the ingestion inhibiting dynamic jet 62 is aimed directly at the ingested gas 19, or such that it has a radial and/or tangential component that influences recirculation in the recirculation cavity 40. For example, the ingestion inhibiting dynamic jet 62 may assist the creation of the clockwise flow of the third portion of the ingested gas 19 in the third section 46. This generally results in the ingestion inhibiting dynamic jet 62 being positioned at a radial angle to an axial engine centerline axis (not shown), such as for example, between about 0° and about 45°. The tangential angle for the dynamic jet 62 is in the direction of turbine rotation between about 0° and about 45°. Computational fluid dynamics (CFD) analysis may be used for determining the orientation of preferred ingestion inhibiting dynamic jet 62. The preferred orientation may vary with application, engine design, and dimensions of the recirculation cavity 40.

Computational fluid dynamics analysis of the gas turbine engine assembly 10 has shown a circumferential pressure distribution with varying high and low pressure fields. The analysis reveals that high pressure areas are located near the region of the trailing edges of the stator vanes 18 (FIG. 1). At these high pressure locations, the mainstream hot gas flow 17 is more likely to be ingested. The ingestion inhibiting dynamic jets 62 may be provided at circumferential locations that correspond to the high pressure areas for additional cooling and pressure to assist the recirculation of the ingested gas 19 in the recirculation cavity 40. Accordingly, at least one ingestion inhibiting dynamic jet 62 may be positioned circumferentially in line with the trailing edge wake of each stator vane 18. Typically, between 1 and 4 ingestion inhibiting dynamic jets 62 will be utilized per stator vane 18, although other embodiments could use any number of ingestion inhibiting dynamic jets 62. The diameter of a useful ingestion inhibiting dynamic jet 62 may vary. For some applications, the diameter of an ingestion inhibiting dynamic jet 62 may be between about 0.01 and about 0.05 inches.

Figure 3:
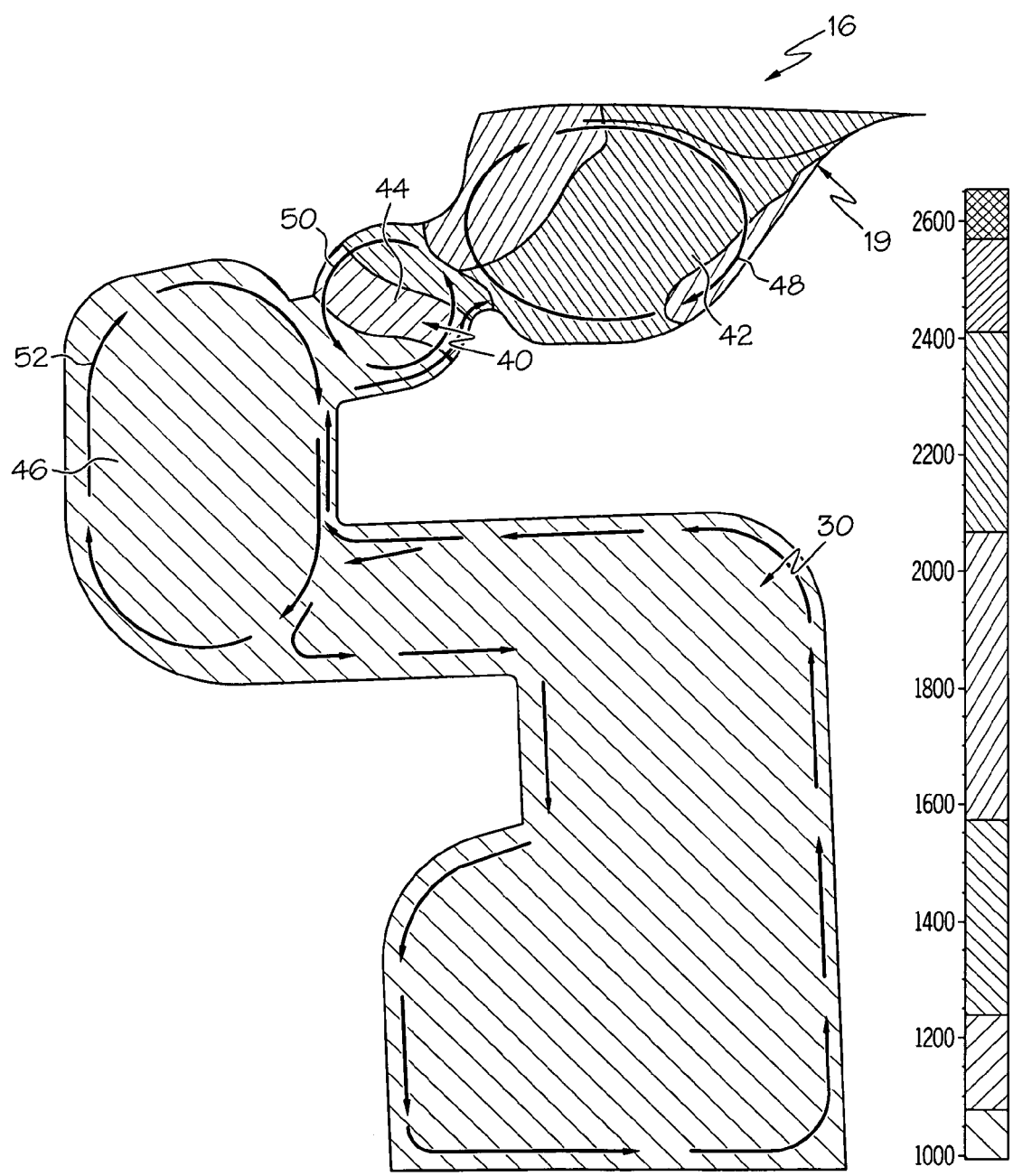
FIG. 3 shows a computational fluid dynamics (CFD) analysis of ingested gas in the gas turbine engine assembly of FIGS. 1 and 2.

FIG. 3 shows a computational fluid dynamics (CFD) analysis of the ingested gas 19 in one exemplary embodiment. As can be seen, the ingested gas 19 may be trapped near the mainstream hot gas flow path 16, particularly at the first section 42 of the recirculation cavity 40. Additionally, the second section 44 and the third section 46 may further isolate other portions of the turbine disk cavity 30 from the ingested gas 19. This results in a turbine disk cavity 30 that is progressively cooler in a radially inward direction, i.e., the third section 46 is cooler than the second section 44, the second section 44 is cooler than the first section 42, and the areas interior to the third section 46 are cooler than any of the sections 42, 44, 46. CFD analysis results confirm that the turbine disk cavity 30 can be adequately cooled using less cavity purge air 41 (FIG. 1) than is required with the prior art. In the particular exemplary configuration of FIG. 3, the recirculation cavity 40 is successful in maintaining a temperature in the range of less than 1200° F., even though the ingested gas 19 has a temperature around 2200° F.

Accordingly, exemplary embodiments provide a recirculation cavity 40 that substantially prevents or reduces penetration of the ingested gas 19 into the turbine disk cavity 30, thereby achieving substantially improved overall temperature control. Exemplary embodiments may minimize the amount of air necessary to cool the gas turbine engine assembly 10 and increase efficiency. Additionally, because of the simplicity of the design, the systems and methods disclosed herein can be readily incorporated on new design engines or it can be economically retrofitted on existing engines. One exemplary embodiment may reduce cooling flow requirements by up to 0.4% of core flow, thereby resulting in an improvement in specific fuel consumption (SFC) of up to 0.2%. Additionally, exemplary embodiments may reduce turbine disk cavity temperatures by, for example, 100-200° F.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine assembly, comprising:
   a housing including an annular duct wall that at least partially defines a mainstream hot gas flow path configured to receive mainstream hot gas flow;
   a stator assembly including a stator vane that extends into the mainstream hot gas flow path; and
   a turbine rotor assembly downstream of the stator assembly and including a turbine disk and a turbine blade extending from the turbine disk into the mainstream hot gas flow path, the stator assembly and turbine assembly defining a turbine disk cavity, the turbine disk cavity including a recirculation cavity configured to recirculate gas ingested from the mainstream hot gas flow path back into the mainstream hot gas flow path.

2. The gas turbine assembly of claim 1, wherein the recirculation cavity includes a plurality of recirculation sections.

3. The gas turbine engine assembly of claim 2, wherein the recirculation cavity includes a gap adjacent the mainstream hot gas flow path at which the gas is ingested, the plurality of recirculation sections including a first recirculation section adjacent the gap and configured to recirculate a first portion of the ingested gas in a first direction, and a second recirculation section adjacent the first recirculation section and configured to recirculate a second portion of the ingested gas in a second direction.

4. The gas turbine engine assembly of claim 3, wherein the plurality of recirculation sections include a third recirculation section adjacent the second recirculation section and configured to recirculate a third portion of the ingested gas in the first direction.

5. The gas turbine engine assembly of claim 3, wherein the turbine rotor assembly includes a turbine discourager and the stator assembly includes a stationary discourager that overlaps the turbine discourager, the turbine discourager and the stationary discourager defining the gap of the recirculation cavity.

6. The gas turbine engine assembly of claim 5, wherein the first recirculation section is at least partially formed by a first deflector extending from the turbine discourager.

7. The gas turbine engine assembly of claim 6, wherein the second recirculation section is at least partially formed by the first deflector extending from the turbine discourager and a second deflector extending from the stationary discourager.

8. The gas turbine engine assembly of claim 5, wherein the first and second sections are separated by a first deflector extending from the turbine discourager.

9. The gas turbine engine assembly of claim 8, wherein the plurality of recirculation sections include a third recirculation section configured to recirculate a third portion of the ingested gas in the first direction, the second and third sections being separated by a second deflector extending from the stationary discourager.

10. The gas turbine engine assembly of claim 9, wherein the third section is at least partially defined by the second deflector extending from the stationary discourager and a third deflector extending from the stationary discourager.

11. The gas turbine engine assembly of claim 8, wherein the first deflector is at least one of a chamfer and a fillet.

12. The gas turbine engine assembly of claim 2, wherein the stator assembly further includes an ingestion inhibiting dynamic jet for delivering air flow to the recirculation cavity.

13. The gas turbine engine assembly of claim 12, wherein the ingestion inhibiting dynamic jet is pointed directly at the ingested gas.

14. The gas turbine engine assembly of claim 1, wherein turbine rotor assembly rotates to result in a pumping action that contributes to the recirculation cavity recirculating the ingested gas back into the mainstream hot gas flow path.

15. An assembly for recirculating gas ingested from a mainstream hot gas flow into a turbine disk cavity between a stator assembly and a turbine assembly in a gas turbine engine, comprising:
    a stationary discourager configured to be positioned on a downstream side of the stator assembly; and
    a turbine rotor discourager configured to be positioned on an upstream side of the turbine assembly, the stationary and turbine rotor discouragers defining a recirculation cavity for recirculating the ingested gas back into the mainstream hot gas flow.

16. The assembly of claim 15, wherein the recirculation cavity includes a plurality of sections.

17. The assembly of claim 16, wherein the sections are separated from one another by at least one deflector.

18. The assembly of claim 16, wherein the plurality of recirculation sections include a first recirculation section configured to recirculate a first portion of the ingested gas in a first direction and a second recirculation section configured to recirculate a second portion of the ingested gas in a second direction.

19. The assembly of claim 15, wherein the stator assembly further includes an ingestion inhibiting dynamic jet for directing air flow into the recirculation cavity opposite the ingested gas.

20. A gas turbine engine assembly, comprising:
    a housing including an annular duct wall that at least partially defines a mainstream hot gas flow path configured to receive mainstream hot gas flow;

a stator assembly including a stator vane that extends into the mainstream hot gas flow path, the stator assembly further including a stationary discourager extending in a downstream direction; and a turbine rotor assembly downstream of the stator assembly and including a turbine disk and a turbine blade extending from the turbine disk into the mainstream hot gas flow path, the turbine rotor assembly further including a turbine discourager that extends in an upstream direction and is overlapped by the stationary discourager, the stator assembly and turbine assembly defining a turbine disk cavity with a gap adjacent the mainstream hot gas flow between the turbine discourager and the stationary discourager, the turbine disk cavity including a recirculation cavity configured to recirculate gas ingested from the mainstream hot gas flow path back into the mainstream hot gas flow path, the recirculation cavity including a first recirculation section adjacent the gap and configured to recirculate a first portion of the ingested gas in a first direction, the first recirculation section being at least partially formed by a first deflector extending from the turbine discourager, a second recirculation section adjacent the first recirculation section and configured to recirculate a second portion of the ingested gas in a second direction, the second recirculation section being at least partially formed by the first deflector extending from the turbine discourager and a second deflector extending from the stationary discourager, and a third recirculation section configured to recirculate a third portion of the ingested gas in the first direction, the third section being at least partially defined by the second deflector extending from the stationary discourager and a third deflector extending from the stationary discourager.

* * * * *